(12) United States Patent
Liu et al.

(10) Patent No.: US 11,922,858 B2
(45) Date of Patent: Mar. 5, 2024

(54) DISPLAY APPARATUS, METHOD FOR SYNTHESIZING IMAGES OF MOVING OBJECT AND DEVICE

(71) Applicant: Yungu (Gu'an) Technology Co., Ltd., Hebei (CN)

(72) Inventors: Rusheng Liu, Langfang (CN); Junfei Cai, Langfang (CN)

(73) Assignee: Yungu (Gu'an) Technology Co., Ltd., Langfang (CN)

(*) Notice: Subject to any disclaimer, the term of this patent is extended or adjusted under 35 U.S.C. 154(b) by 0 days.

(21) Appl. No.: 18/085,833

(22) Filed: Dec. 21, 2022

(65) Prior Publication Data
US 2023/0230528 A1 Jul. 20, 2023

Related U.S. Application Data

(63) Continuation of application No. PCT/CN2021/108462, filed on Jul. 26, 2021.

(30) Foreign Application Priority Data

Oct. 28, 2020 (CN) .......................... 202011172493.9

(51) Int. Cl.
*G09G 3/22* (2006.01)
*G06T 5/50* (2006.01)
(Continued)

(52) U.S. Cl.
CPC ............... *G09G 3/22* (2013.01); *G06T 5/50* (2013.01); *G06V 10/44* (2022.01); *G06V 10/761* (2022.01);
(Continued)

(58) Field of Classification Search
CPC ......... G06T 5/005; G06T 5/50; G06T 7/246; G06T 2207/20221; G06V 10/44;
(Continued)

(56) References Cited

U.S. PATENT DOCUMENTS

| 11,469,404 | B2* | 10/2022 | Li | H01L 23/562 |
| 2021/0247621 | A1* | 8/2021 | Yang | G01B 11/254 |
| 2022/0344432 | A1* | 10/2022 | Shi | H10K 59/131 |

FOREIGN PATENT DOCUMENTS

| CN | 100461337 C | 2/2009 |
| CN | 110189627 A | 8/2019 |

(Continued)

OTHER PUBLICATIONS

PCT International Search Report for International Application No. PCT/CN2021/108462 dated Oct. 26, 2021.
(Continued)

*Primary Examiner* — Nelson M Rosario
(74) *Attorney, Agent, or Firm* — Rimon PC (57) ABSTRACT

Disclosed are a display apparatus, a method for synthesizing images of a moving object and a device. The display apparatus includes: a display panel, including a main display region and a transparent display region at least partially provided in the main display region; and an image acquisition component, provided on a non-display side of the transparent display region, and configured to acquire a light incident from a display side of the transparent display region and penetrating the transparent display region. The image acquisition component is configured to continuously acquire, at a predetermined time interval, light of a moving object transmitting through the transparent display region, to obtain n images, diffraction spots of at least two of the n images are different. The image acquisition component is further configured to merge the n images to obtain m synthetic image(s) to eliminate or weaken diffraction spots in the n images.

20 Claims, 5 Drawing Sheets

Identifying and comparing features of non-diffraction spot in the P features to obtain S target category feature(s), where S is a natural number less than P/n — 450

Obtaining a target image of the moving object according to the S target category feature(s) and the synthetic image — 460

(51) Int. Cl.
*G06V 10/44* (2022.01)
*G06V 10/74* (2022.01)

(52) U.S. Cl.
CPC .............. *G06T 2207/20221* (2013.01); *G09G 2320/0686* (2013.01)

(58) Field of Classification Search
CPC .... G06V 10/761; G06V 40/1318; G09G 3/20; G09G 3/22; G09G 2300/0426; G09G 2320/0686; G09G 2360/14
See application file for complete search history.

(56) References Cited

FOREIGN PATENT DOCUMENTS

| | | |
|---|---|---|
| CN | 110753999 A | 2/2020 |
| CN | 110767106 A | 2/2020 |
| CN | 111091782 A | 5/2020 |
| CN | 111261684 A | 6/2020 |
| CN | 111292617 A | 6/2020 |
| CN | 111476747 A | 7/2020 |
| CN | 111526278 A | 8/2020 |
| CN | 111968516 A | 11/2020 |
| CN | 112258439 A | 1/2021 |

OTHER PUBLICATIONS

PCT Written opinion for International Application No. PCT/CN2021/108462 dated Oct. 26, 2021.
Chinese first office action for application No. 202011172493.9 dated Jan. 25, 2022.
Chinese second office action for application No. 202011172493.9 dated Mar. 18, 2022.

* cited by examiner

DISPLAY APPARATUS, METHOD FOR SYNTHESIZING IMAGES OF MOVING OBJECT AND DEVICE

CROSS-REFERENCE TO RELATED APPLICATIONS

The present application is a continuation application of International Application No. PCT/CN2021/108462 filed on Jul. 26, 2021, which claims priority to Chinese Patent Application No. 202011172493.9 filed on Oct. 28, 2020. Both applications are incorporated herein by reference in their entireties.

TECHNICAL FIELD

The present application relates to the technical field of display screens, in particular to a display apparatus, a method for synthesizing images of a moving object and a device.

BACKGROUND

With the continuous development of display panel technology, people's requirements for display panels are getting higher and higher, especially requirements for display effects, such as pixel density and main display region. In order to increase an area of a main display region, a region where a camera is conventionally set is also used for display, which can not only improve a screen ratio, but also improve an aesthetic. However, when a camera region is used for display, it is necessary to dispose pixel units in this region, and a slender gap is formed between neatly arranged pixel units, which is easy to cause diffraction of light, resulting in appearance of light spots when taking pictures or taking videos.

SUMMARY

In view of this, embodiments of the present application are devoted to providing a display apparatus, a method for synthesizing images of a moving object and a device. A transparent display region is disposed in a main display region, an image acquisition component is disposed on a non-display side of the transparent display region, and n images are obtained by using the image acquisition component to continuously acquire light of a same moving object at a predetermined time interval, where diffraction spots of at least two of the n images are different. The n images are merged into m image(s) (m synthetic image(s)) by using an algorithm, to eliminate or weaken diffraction spots in the images, thereby improving the display effect.

According to an aspect of the present application, an embodiment of the present application provides a display apparatus, which includes: a display panel, including a main display region and a transparent display region at least partially provided in the main display region; and an image acquisition component, provided on a non-display side of the transparent display region, and configured to acquire light incident from a display side of the transparent display region and penetrating the transparent display region. The image acquisition component is configured to continuously acquire, at a predetermined time interval, light of a moving object transmitting through the transparent display region, to obtain n images. and diffraction spots of at least two of the n images are different. The image acquisition component is further configured to merge the n images to obtain m synthetic image(s) to eliminate or weaken diffraction spots in the n images, where n>=m, n is a natural number greater than or equal to 2, and m is a natural number greater than or equal to 1.

According to another aspect of the present application, an embodiment of the present application provides a method for synthesizing images of a moving object, and the method includes following steps: obtaining n images of the moving object, where n is a natural number greater than or equal to 2, and the n images are captured continuously by a single image acquisition component at a predetermined time interval; performing feature extraction on the n images to obtain P features of the n images, where P is an integer multiple of n; identifying, Q diffraction spot feature(s) corresponding to Q diffraction spot(s) of a current image in the n images and object feature(s) covered by the Q diffraction spot(s) in a non-current image, from the P features, where Q is a natural number less than n; and performing feature fitting on the Q diffraction spot feature(s) and the object feature(s) covered by the Q diffraction spot(s) to obtain a synthetic image.

According to another aspect of the present application, an embodiment of the present application provides an electronic device, which includes: a processor; and a memory. The memory includes computer instructions stored thereon, and the computer instructions, when executed by the processor, cause the processor to execute the above-mentioned method for synthesizing images of a moving object.

According to another aspect of the present application, an embodiment of the present application provides a computer-readable storage medium, the storage medium stores a computer program, and the computer program is used to execute the above-mentioned method for synthesizing images of a moving object.

Embodiments of the present application provide a display apparatus, a method for synthesizing images of a moving object and a device. A transparent display region is disposed in a main display region, an image acquisition component is disposed on a non-display side of the transparent display region, and n images are obtained by using the image acquisition component to continuously acquire light of a same moving object at a predetermined time interval, where diffraction spots of at least two of the n images are different. The n images are merged into m image(s) by using an algorithm, to eliminate or weaken diffraction spots in the images, thereby improving the display effect.

DETAILED DESCRIPTION OF THE EMBODIMENTS

The technical solutions in the embodiments of the present application will be clearly and completely described below with reference to the accompanying drawings in the embodiments of the present application. Obviously, the described embodiments are only a part of the embodiments of the present application, but not all of the embodiments.

Further, in the exemplary embodiments, since the same reference numerals denote the same components having the same structure or the same steps of the same method, if one embodiment is described in an illustrative way, only structures or methods that differ from the described embodiment are described in other exemplary embodiments.

Figure 1:
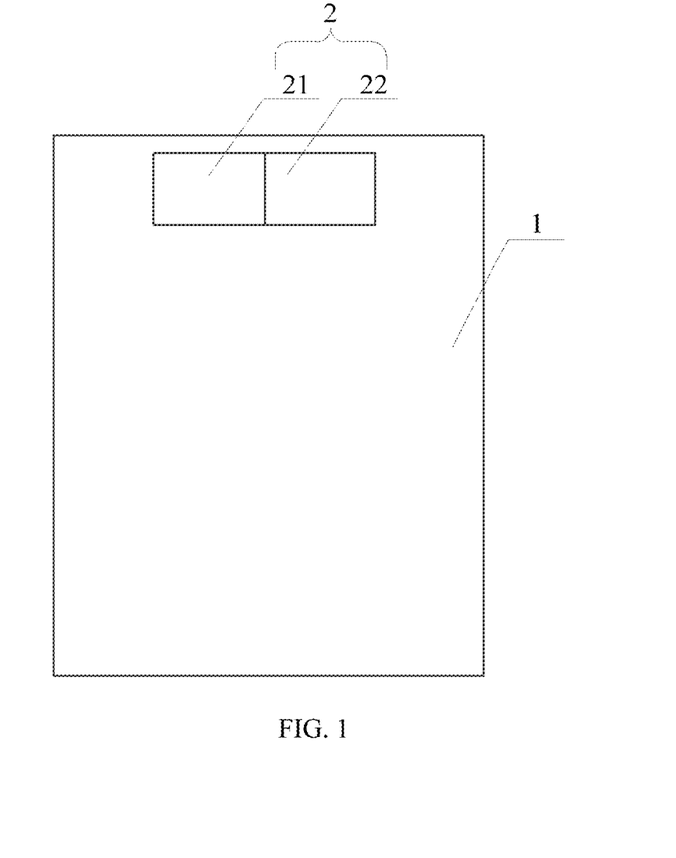
FIG. 1 is a schematic structural diagram illustrating a display apparatus according to an embodiment of the present application.

FIG. 1 is a schematic structural diagram illustrating a display apparatus according to an embodiment of the present application. As shown in FIG. 1, the display apparatus includes a display panel, and the display panel includes a main display region 1, a transparent display region 2 at least partially provided in the main display region 1 and an image acquisition component provided on a non-display side of the transparent display region 2. Light of an object is incident from a display side of the transparent display region 2 and penetrates the transparent display region 2 to be acquired and imaged by the image acquisition component. Light of the same moving object is acquired continuously by the image acquisition component at a predetermined time interval to obtain n images, and diffraction spots of at least two of the n images are different. The image acquisition component is further configured to merge the n images to obtain m synthetic image(s) through an algorithm to eliminate or weaken diffraction spots in the acquired images, and an image of the moving object with weakened diffraction spot or without diffraction spot is obtained, so as to improve an imaging effect of an object.

In an embodiment, a light transmittance of the transparent display region 2 is greater than a light transmittance of the main display region 1.

In order to increase a display area and screen ratio of a display panel, more and more display panels have begun to try narrow bezel or full screen. The display panel usually has a camera function, especially a front-facing camera function, which requires external light from a display side of the display panel to enter an image acquisition component (such as a camera) of the display panel. At present, it is common to set a front-facing camera, and thus external light may be acquired by the front-facing camera, thereby realizing image acquisition on the display side of the display panel. However, to realize the disposing of the front-facing camera, it is necessary to reserve a certain location area on the display panel to place the front-facing camera. This location area cannot realize display, so that the screen ratio of the display panel cannot be further improved, and the full screen cannot be realized. In order to solve this problem, the under-screen camera has emerged, that is, the camera is placed at the bottom of the display body (the non-display side of the display panel), and a light propagation path is established between the camera and the display side of the display panel to realize front-facing video-recording or photographing. At the same time, pixel units are provided in a camera area to realize a display function, thereby increasing the display region and screen ratio of the display panel. Although this method may realize image acquisition and display functions of the camera area, due to the formation of a slender gap between the pixel units, a diffraction grating is formed by the pixel units arranged in an array and gaps thereof. Diffraction phenomenon occurs after the light from the display side of the display panel enters the diffraction grating, resulting in diffraction spots in the acquired images. For example, when photographing a lighted street lamp at night, a bright dot will appear at a light source position of the street lamp in the image, and a bright spot will appear around the bright dot (possibly a cross bright spot).

A necessary condition for the diffraction spot is a slender gap. Therefore, for some display panels, the pixel density of the camera area is reduced to widen a width of the gap between pixel units to reduce the diffraction spot phenomenon. However, a display effect of the camera area will be reduced if the pixel density is reduced, and the display effect of the camera area is significantly different from that of other display areas, thereby reducing the display effect of the display panel and an user experience effect.

In order to solve a contradiction between the diffraction spot and the display effect, an embodiment of the present application provides a display apparatus. A transparent display region 2 is disposed in a main display region 1 or on one side of the main display region 1, and n images are obtained by using an image acquisition component to continuously acquire light of the same moving object at a predetermined time interval through the transparent display region 2, where diffraction spots of at least two of the n images are different (for example, center points of the diffraction spots are the same but extension directions of the diffraction spots are different, etc.). Then images are merged by the image acquisition component through an algorithm to obtain m synthetic image(s), and diffraction spots of the acquired images may be eliminated or weakened in the synthetic image to obtain an image of the moving object with weakened diffraction spot or without diffraction spot, so as to improve an imaging effect of the object and restore an original appearance of the images. Furthermore, pixel units may be normally disposed in the transparent display region 2 (like other regions of the main display region 1), thereby ensuring the display effect and screen ratio of the entire display apparatus.

In an embodiment, the image acquisition component may be a device for acquiring images, such as a camera. It should be understood that a type of the image acquisition component may be selected according to a requirement of an actual application scenario in the embodiments of the present application, as long as the selected type of the image acquisition component can realize image acquisition, and the embodiments of the present application do not limit the specific type of the image acquisition component.

The embodiments of the present application provide a display apparatus, a transparent display region is disposed in a main display region, an image acquisition component is disposed on a non-display side of the transparent display region, and n images are obtained by using the image acquisition component to continuously acquire light of a same moving object at a predetermined time interval, where diffraction spots of at least two of the n images are different. The n images are merged into m image by using an algorithm, to eliminate or weaken diffraction spots in the images, thereby improving the display effect.

In an embodiment, the image acquisition component may superimpose the n images and retain only an overlapping part. After the image acquisition component acquires n images respectively, the n images may be superimposed by using an algorithm and only the overlapping part is retained, that is, the n images are aligned and superimposed, so that center positions of the diffraction spots at the same position in the n images coincide. Then a bright spot in a non-coincidence position is deleted or set as a background, thus realizing the elimination or weakening of the diffraction spots. It should be understood that the embodiment of the present application only provides an algorithm to realize the elimination of the diffraction spots by way of example, and other algorithms may also be used in the embodiment of the present application, as long as the adopted algorithm can realize the elimination of the diffraction spots. The embodiments of the present application do not limit the specific algorithm for eliminating diffraction spots.

In an embodiment, as shown in FIG. 1, the transparent display region 2 may include a first transparent display region 21 and a second transparent display region 22 disposed adjacently, and the image acquisition component acquires light through the first transparent display region 21 and the second transparent display region 21 to obtain a first image and a second image respectively. A shape of a diffraction spot in the first image is different from that in the second image, and the image acquisition component merges the first image and the second image to eliminate or weaken the diffraction spots. It should be understood that in the embodiments of the present application, by disposing the first transparent display region 21 and the second transparent display region 22 to be different (for example, in terms of structure, shape, etc.), the different shapes of the diffraction spots in the first image and the second image, obtained by the image acquisition component respectively through the first transparent display region 21 and the second transparent display region 22, may be realized. The embodiments of the present application do not limit the specific manner for realizing the different shapes of the diffraction spots in the first image and the second image. In an embodiment, the image acquisition component may sequentially acquire light of the same moving object transmitting through the first transparent display region 21 and the second transparent display region 22 at a predetermined time interval to obtain n images (where n may be equal to 2, or may be greater than 2). Since stationary object will also be acquired when acquiring images, or some moving objects will be in a static state during the acquisition process, in order to ensure that at least two of the acquired n images have different diffraction spots, the embodiments of the present application may obtain light of the same moving object by using different transparent display regions, so that at least two images with different diffraction spots may be obtained. It should be understood that the transparent display region 2 in the embodiments of the present application may only include two parts, or may include multiple parts, for example, three parts or more, so that three or more images with different diffraction spots may be obtained, and multiple images may be merged to eliminate the diffraction spots more accurately. The embodiments of the present application do not limit the specific partition situation of the transparent display region 2.

The following description only takes the transparent display region 2 including two parts (that is, the first transparent display region 21 and the second transparent display region 22) as an example. The cases where the transparent display region 2 includes three parts and more than three parts are similar to the case where the transparent display region 2 includes two parts, and the details are not described herein again.

Figure 2A:
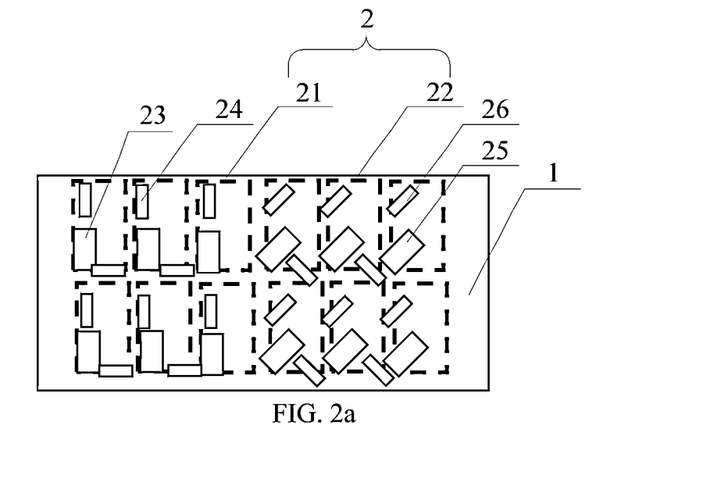
FIG. 2*a* is a schematic structural diagram illustrating a cross-section along a direction parallel to a screen body of a display apparatus according to an embodiment of the present application.
Figure 2B:
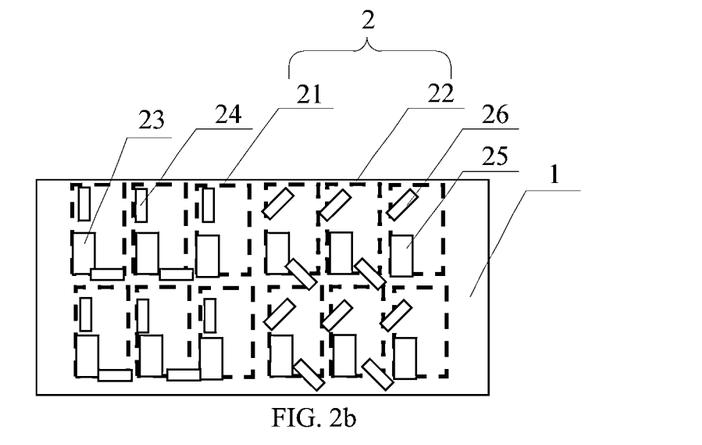
FIG. 2*b* is a schematic structural diagram illustrating a cross-section along a direction parallel to a screen body of a display apparatus according to another embodiment of the present application.

FIG. 2a and FIG. 2b respectively shows a schematic structural diagram illustrating a cross-section along a direction parallel to a screen body of a display apparatus according to an embodiment of the present application. As shown in FIG. 2a and FIG. 2b, the first transparent display region 21 includes a first driving circuit 23 arranged in an array and a first metal trace 24 connected to the first driving circuit 23, and the second transparent display region 22 includes a second driving circuit 25 arranged in an array and a second metal trace 26 connected to the second driving circuit 25. The arrangement of the first driving circuit 23 and the arrangement of the second driving circuit 25 may be different (as shown in FIG. 2a), and/or, an extension direction of the first metal trace 24 and an extension direction of the second metal trace 26 may be different (as shown in FIG. 2b). The arrangement of the first driving circuit 23 is set to be different from the arrangement of the second driving circuit 25, and/or, the extension direction of the first metal trace 24 is set to be different from the extension direction of the second metal trace 26, so as to realize that the diffraction spots generated by light in the first transparent display region 21 and the second transparent display region 22 are different in shape, and realize the diffraction spots in the first image and the second image respectively obtained by the image acquisition component from the first transparent display region 21 and the second transparent display region 22 are different in shape. Furthermore, the diffraction spots with different shapes to be merged to eliminate the diffraction spots by using an algorithm. It should be understood that the arrangements of the first driving circuit 23 and the second driving circuit 25, and the extension directions of the first metal trace 24 and the second metal trace 26 may be selected according to different practical application scenarios in the embodiments of the present application. For example, only the arrangements of the first driving circuit 23 and the second driving circuit 25 are different, or only the extension directions of the first metal trace 24 and the second metal trace 26 are different, or the arrangements of the first driving circuit 23 and the second driving circuit 25 are different and the extension directions of the first metal trace 24 and the second metal trace 26 are different. As long as the shapes of the diffraction spots in the first image and the second image respectively obtained through the first transparent display region 21 and the second transparent display region 22 are different, the specific arrangements of the first driving circuit 23 and the second driving circuit 25, and the specific extension directions of the first metal trace 24 and the second metal trace 26 are not limited in the embodiments of the present application.

In an embodiment, a specific way to realize different arrangements of the first driving circuit 23 and the second driving circuit 25 may be that the second driving circuit 25 is inclined relative to the first driving circuit 23 (as shown in FIG. 2a). In order to ensure the consistency of display effects in the first transparent display region 21 and the second transparent display region 22, the first driving circuit 23 and the second driving circuit 25 in the first transparent display region 21 and the second transparent display region 22 have the same arrangement density; moreover, by disposing the second driving circuit 25 to be inclined relative to the first driving circuit 23, the arrangements of gratings at the first transparent display region 21 and the second transparent display region 22 are changed (the arrangements of gratings at the first transparent display region 21 and the second transparent display region 22 are different), thereby changing the shapes of the diffraction spots generated by light in the first transparent display region 21 and the second transparent display region 22 (the shapes of the diffraction spots generated at the first transparent display region 21 and the second transparent display region 22 are different). In a further embodiment, an inclination angle of the second driving circuit 25 relative to the first driving circuit 23 may be greater than 0 degrees and less than 45 degrees. Because if the inclination angle is too small, the diffraction spots in the first image and the second image may be similar in shape, which increases the difficulty of an algorithm to eliminate the diffraction spots; while if the inclination angle is too large, inconsistent arrangement density may be caused by a large difference between the arrangements of the driving circuits in the first transparent display region 21 and the second transparent display region 22, which leads to a problem of inconsistent display. Therefore, in the embodiments of the present application, the difficulty of the algorithm for eliminating the diffraction spots and the problem of display consistency are comprehensively considered, and the inclination angle is limited to be greater than 0 degrees and less than 45 degrees.

Figure 3:
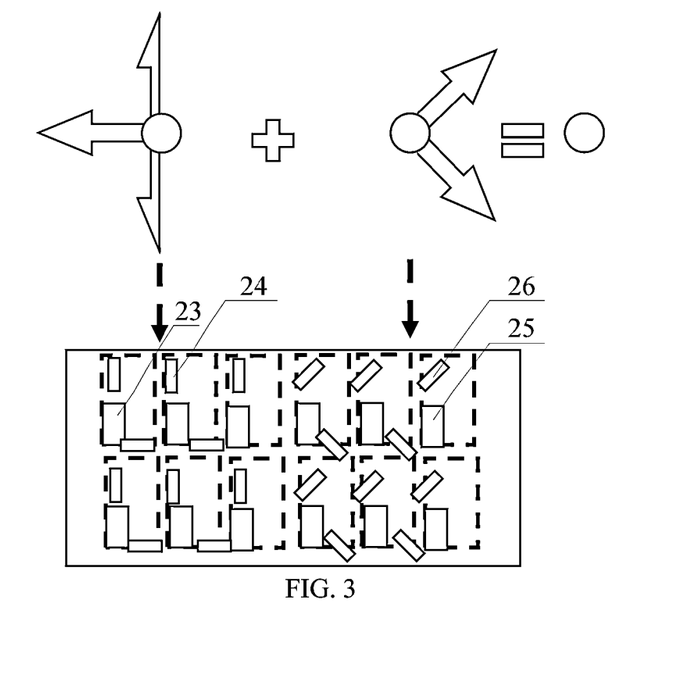
FIG. 3 is a schematic structural diagram for eliminating a diffraction spot according to an embodiment of the present application.

FIG. 3 is a schematic structural diagram for eliminating a diffraction spot according to an embodiment of the present application. As shown in FIG. 3, taking the first metal trace 24 and the second metal trace 26 with different extension directions as an example, a diffraction spot (shown in the upper left in FIG. 3) in a first image and a diffraction spot (shown in the upper right in FIG. 3) in a second image are obtained respectively through the first transparent display region 21 and the second transparent display region 22 in FIG. 3 by the image acquisition component, shapes of the two diffraction spots are different, and then the two diffraction spots are merged to obtain an overlapping bright dot located at middle of the two diffraction spots, which realizes elimination of the diffraction spots and improves effect of image acquisition. The shapes of diffraction spots in the first image and the second image obtained by other ways in the foregoing embodiment are similar to those shown in FIG. 3, and details are not described herein again.

In an embodiment, a metal layer may be provided on the first metal trace 24 to shield the first metal trace 24; and/or a metal layer may be provided on the second metal trace 26 to shield the second metal trace 26. By disposing a metal layer on the metal trace, the first metal trace 24 and the second metal trace 26 may be shielded by the metal layer, so as to avoid an occurrence of diffraction by light at the first metal trace 24 and the second metal trace 26 as much as possible, which may reduce the generation probability of diffraction spots, that is, reduce the number of diffraction spots, thus being more beneficial to eliminate diffraction spots. At the same time, it may also avoid that too much information in the acquired images is covered by diffraction spots due to too many diffraction spots, thus avoiding image distortion after eliminating the diffraction spots, that is, improving the authenticity of the image. In an embodiment, the metal layer may be metal layer M4 or other metal layers. The first metal trace 24 and/or the second metal trace 26 may be shielded by the metal layer adjacent to the first metal trace 24 and the second metal trace 26 to avoid diffraction phenomenon. It should be understood that, in the embodiments of the present application, different metal layers may be selected to shield the first metal trace 24 and the second metal trace 26 according to requirements of actual application scenarios, as long as the selected metal layer can realize shielding of the first metal trace 24 and the second metal trace 26, and the embodiments of the present application do not limit a specific film layer (for example, anode layer, gate layer, source layer or drain layer, etc.) of the metal layer.

In an embodiment, thicknesses of the metal layers shielding different metal traces, along a stacking direction of film layers may be different. By setting the thickness of the metal layer shielding the metal traces along the stacking direction of the film layers to be different, a light wave equation of light may be changed in terms of amplitude or phase, so as to avoid the superposition of the diffraction light waves, generated by lights that are close to each other, to form a diffraction spot, and diffraction spots are further eliminated. It should be understood that, in the embodiments of the present application, the thickness of the metal layer may be selected according to requirements of the actual application scenario, for example, the thickness of the metal layer gradually decreases along one direction, as long as the thickness of the selected metal layer may shield the metal trace and change the superposition of the diffraction light waves, and the specific thickness of the metal layer is not limited in the embodiments of the present application. In an embodiment, a shape of the first metal trace 24 may include a curve or a straight line; and/or a shape of the second metal trace 26 may include a curve or a straight line. Since a slender gap is a necessary condition for generating diffraction spots, the first metal trace 24 and/or the second metal trace 26 may be set as a curve, such as a curve-function shaped line, so that the generation probability of diffraction spots may be reduced. It should be understood that in the embodiments of the present application, different shapes of the first metal trace 24 and the second metal trace 26 may be selected according to requirements of an actual application scenario, as long as the shapes of the selected first metal trace 24 and second metal trace 26 may realize electrical connection of the driving circuits and reduce the generation probability of the diffraction spot. The specific shapes of the first metal trace 24 and the second metal trace 26 are not limited in the embodiments of the present application. In an embodiment, the first metal trace 24 and/or the second metal trace 26 may include transparent metal wires. By disposing the transparent metal wires, the light transmittance of the first metal trace 24 and/or the second metal trace 26 may be improved, thereby improving the effect of image acquisition.

In an embodiment, as shown in FIG. 3, the first driving circuit 23 and the second driving circuit 25 may be prepared by a high-precision exposure machine, where a line width of the high-precision exposure machine is less than or equal to 2 microns, and a line pitch of the high-precision exposure machine is less than or equal to 1.8 microns. Therefore, a line width of the first driving circuit 23 and the second driving circuit 25 is less than or equal to 2 microns, and the line pitch of the first driving circuit 23 and the second driving circuit 25 is less than or equal to 1.8 microns. The dotted line part in FIG. 3 is a driving circuit prepared by a conventional exposure machine, and the solid line part is a driving circuit prepared by the high-precision exposure machine in the embodiment of the present application. By using a high-precision exposure machine to prepare the driving circuit, a size of the driving circuit may be reduced, and the driving circuit may be placed under a corresponding anode position, thereby reducing an opaque area, ensuring the light transmittance and improving the effect of image acquisition. It should be understood that in the embodiments of the present application, the size of the driving circuit (that is, the accuracy of the exposure machine) may be selected according to requirements of an actual application scenario, as long as the selected size of the driving circuit can meet driving requirements and ensure the light transmittance, and the embodiments of the present application do not limit the specific size of the driving circuit.

In an embodiment, the first transparent display region 21 and the second transparent display region 22 may be asymmetrical. In another embodiment, areas of the first transparent display region 21 and the second transparent display region 22 may be different. In another embodiment, the light transmittances of the first transparent display region 21 and the second transparent display region 22 are different. In another embodiment, the pixel density of the first transparent display region 21 and the second transparent display region 22 are different. By disposing the first transparent display region 21 and the second transparent display region 22 to be asymmetrical, or different in area, light transmittance or pixel density, shapes of the diffraction spots generated by light at the first transparent display region 21 and the second transparent display region 22 may be different, so that the diffraction spots may be merged and eliminated by an algorithm.

It should be understood that, in the embodiments of the present application, a method for realizing the different shapes of the diffraction spots generated by light in the first transparent display region 21 and the second transparent display region 22 may be selected according to requirements of actual application scenarios, as long as the selected method can realize different shapes of the diffraction spots generated by light in the first transparent display region 21 and the second transparent display region 22, and the embodiments of the present application do not limit the specific implementation method.

Figure 4:
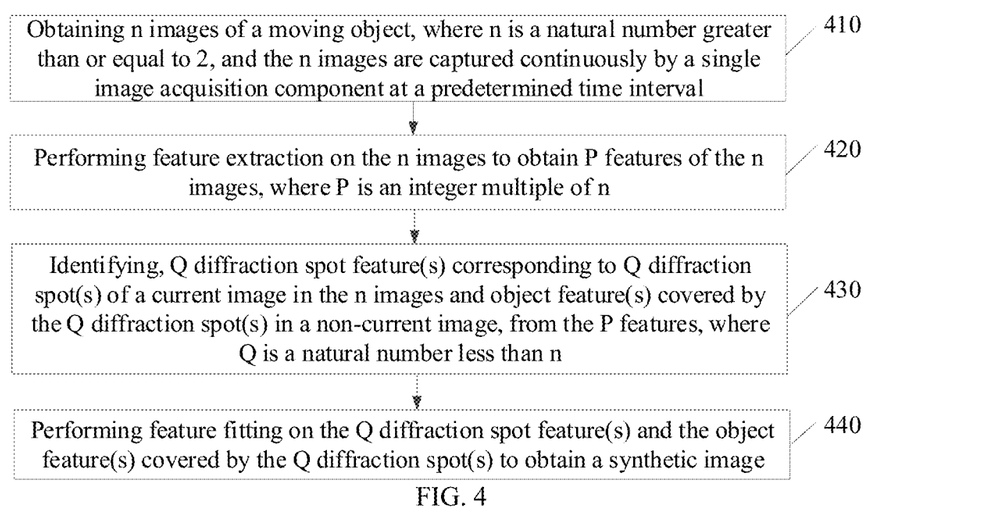
FIG. 4 is a flowchart illustrating a method for synthesizing images of a moving object according to an embodiment of the present application.

FIG. 4 is a flowchart illustrating a method for synthesizing images of a moving object according to an embodiment of the present application. In accordance with the above structure, the embodiments of the present application further provide a method for synthesizing images of a moving object. The specific method steps are shown in FIG. 4, and the method for synthesizing images includes the following contents.

Step 410: obtaining n images of a moving object, where n is a natural number greater than or equal to 2, and the n images are captured continuously by a single image acquisition component at a predetermined time interval.

Since a shooting effect of a moving object during a movement process will be affected by the movement, when light (especially single-point light) of the moving object is too strong, a strong diffraction spot will be generated, and the diffraction spot will cause serious damage to a final imaging, for example, a light spot covers part of the image and causes the image to fail to fully display the moving object. In the embodiments of the present application, the image acquisition component may be used to continuously shoot n times at a predetermined time interval to obtain n images of the same moving object according to the structure of the above-mentioned display apparatus, and comprehensively obtain a real image of the moving object according to information of the same moving object in the n images.

Step 420: performing feature extraction on the n images to obtain P features of the n images, where P is an integer multiple of n.

After acquiring the n images, feature extraction is performed on the n images respectively to obtain P features of the n images, in which the same features are extracted for each image to ensure that all types of features correspond to each other, and ensure mutual reference or verification in subsequent synthesis of images.

Step 430: identifying, Q diffraction spot feature(s) corresponding to Q diffraction spot(s) of a current image in the n images and object feature(s) covered by the Q diffraction spot(s) in a non-current image, from the P features, where Q is a natural number less than n.

Q diffraction spot feature(s) in the current image and the object feature(s) covered by the Q diffraction spot(s) in the non-current image are identified from the obtained P features, that is, a feature related to the diffraction spot in the current image (or target image) and a non-current image (there may be no diffraction spot or the position of the diffraction spot is different from the position of the diffraction spot of the current image) are identified, so that the object feature covered by the diffraction spot in the current image may be obtained from the non-current image by comparison between the current image and the non-current image may, which avoids that an object image cannot be known because of a shielding part of the diffraction spot in the current image.

Step 440: performing feature fitting on the Q diffraction spot feature(s) and the object feature(s) covered by the Q diffraction spot(s) to obtain a synthetic image.

After the diffraction spot features in the current image and the object features covered by the diffraction spots are acquired, the feature fitting is performed based on the diffraction spot features and the object features covered by the diffraction spots to obtain a synthetic image, that is, corresponding feature information (the object features covered by the Q diffraction spots) of the non-current image is used to assist the current image to obtain the real image of the moving object covered by the diffraction spots in the current image.

Figure 5:
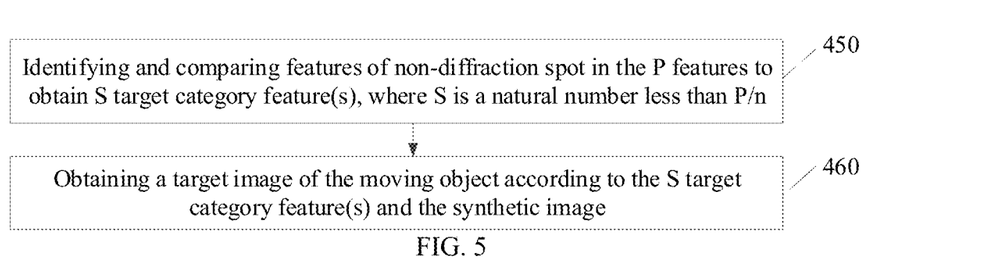
FIG. 5 is a flowchart illustrating a method for synthesizing images of a moving object according to another embodiment of the present application.

FIG. 5 is a flowchart illustrating a method for synthesizing images of a moving object according to another embodiment of the present application. The embodiment of FIG. 5 is proposed based on the embodiment of FIG. 4. In order to avoid repetition, different parts are emphatically described here, and the same parts are not repeated. That is, on the basis of the embodiment of FIG. 4, the method for synthesizing images of a moving object further includes the following contents.

Step 450: identifying and comparing features of non-diffraction spot in the P features to obtain S target category feature(s), where S is a natural number less than P/n.

The other features in the P features extracted from the n images except the diffraction spot feature are identified and compared according to the same type, and target category features of different categories are obtained, that is, S features of non-diffraction spot of different categories.

Step 460: obtaining a target image of the moving object according to the S target category feature(s) and the synthetic image.

The S target category features and the synthetic image are merged to comprehensively obtain the target image of the moving object, that is, the diffraction spot features and the features of non-diffraction spot in the n images are comprehensively considered to obtain a more accurate target image of the moving object.

Through the above steps, the diffraction spot in the current image are eliminated or weakened by using the different diffraction spots of the non-current image and the current image, so as to obtain the object feature covered by the diffraction spot in the current image. The features of non-diffraction spot in the current image are obtained by using the features of non-diffraction spot inn images, so as to improve the accuracy of the features of non-diffraction spot in the current image, restore the real image of the moving object, and improve the shooting effect. It should be understood that the embodiments of the present application may also be applied to photographing a still object, and n images may be obtained only by using a plurality of transparent display regions, so that an object image with high accuracy can be obtained by using the above steps.

Figure 6:
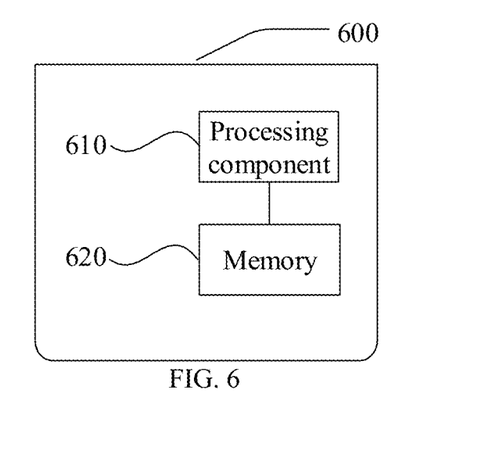
FIG. 6 is a block diagram illustrating an electronic device for synthesizing images of a moving object according to an exemplary embodiment of the present application.

FIG. 6 is a block diagram illustrating an electronic device 600 for synthesizing images of a moving object according to an exemplary embodiment of the present application.

As shown in FIG. 6, the electronic device 600 includes a processing component 610, which further includes one or more processors, and a memory resource, represented by a memory 620, for storing instructions executable by the processing component 610, such as application programs. An application program stored in memory 620 may include one or more modules, each of which corresponding to a set of instructions. In addition, the processing component 610 is configured to execute instructions to perform the above-described method for synthesizing images of a moving object.

The electronic device 600 may also include a power supply assembly configured to perform power management of the electronic device 600, a wired or wireless network interface configured to connect the electronic device 600 to a network, and an input/output (I/O) interface. The electronic device 600 may operate based on an operating system stored in memory 620, for example, Windows Server™, Mac OS X™, Unix™, Linux™, FreeBSD™ or the like.

A non-transitory computer-readable storage medium, when the instructions in the storage medium are executed by the processor of the above-mentioned electronic device 600, cause the above-mentioned electronic device 600 to execute a method for synthesizing images of a moving object, including: obtaining n images of a moving object, where n is a natural number greater than or equal to 2, and the n images are captured continuously by a single image acquisition component at a predetermined time interval; performing feature extraction on the n images to obtain P features of the n images, where P is an integer multiple of n; identifying, Q diffraction spot feature(s) corresponding to Q diffraction spot(s) of a current image in the n images and object feature(s) covered by the Q diffraction spot(s) in a non-current image, from the P features, where Q is a natural number less than n; and performing feature fitting on the Q diffraction spot feature(s) and the object feature(s) covered by the Q diffraction spot(s) to obtain a synthetic image.

Persons skilled in the art may realize that, units and algorithm steps of examples described in combination with the embodiments disclosed here can be implemented by electronic hardware, computer software, or the combination of the two. Whether the functions are executed by hardware or software depends on particular applications and design constraint conditions of the technical solutions. Persons skilled in the art may use different methods to implement the described functions for each particular application, but it should not be considered that the implementation goes beyond the scope of the present disclosure.

It can be clearly understood by persons skilled in the art that, for the purpose of convenient and brief description, for a detailed working process of the foregoing system, apparatus and unit, reference may be made to the corresponding process in the method embodiments, and the details are not to be described here again.

In several embodiments provided in the present application, it should be understood that the disclosed system, apparatus, and method may be implemented in other ways. For example, the described apparatus embodiments are merely exemplary. For example, the unit division is merely logical functional division and may be other division in actual implementation. For example, multiple units or components may be combined or integrated into another system, or some features may be ignored or not performed. Furthermore, the shown or discussed coupling or direct coupling or communication connection may be accomplished through indirect coupling or communication connection between some interfaces, apparatuses or units, or may be electrical, mechanical, or in other forms.

Units described as separate components may be or may not be physically separated. Components shown as units may be or may not be physical units, that is, may be integrated or may be distributed to a plurality of network units. Some or all of the units may be selected to achieve the objective of the solution of the embodiment according to actual demands.

In addition, the functional units in the embodiments of the present disclosure may either be integrated in a processing module, or each be a separate physical unit; alternatively, two or more of the units are integrated in one unit.

If implemented in the form of software functional units and sold or used as an independent product, the integrated units may also be stored in a computer readable storage medium. Based on such understanding, the technical solution of the present disclosure or the part that makes contributions to the prior art, or a part of the technical solution may be substantially embodied in the form of a software product. The computer software product is stored in a storage medium, and contains several instructions to instruct computer equipment (such as, a personal computer, a server, or network equipment) to perform all or a part of steps of the method described in the embodiments of the present disclosure. The storage medium includes various media capable of storing program codes, such as, a USB flash drive, a mobile hard disk, a Read-Only Memory (ROM), a Random Access Memory (RAM), a magnetic disk or an optical disk.

In addition, it should also be noted that combination manners of the technical features in the present application are not limited to the combination manners described in the claims of the present application or the combination manners described in the specific embodiments, and all the technical features described in the present application may be freely combined or integrated in any manner unless there is a contradiction between them.

The above descriptions are only preferred embodiments of the present application, and are not intended to limit the present application. Any modifications, equivalent replacements, etc. made within the spirit and principles of the present application shall be included in the protection scope of the present application.

What is claimed is:

1. A display apparatus, comprising:
    a display panel, comprising a main display region and a transparent display region at least partially provided in the main display region; and
    an image acquisition component, provided on a non-display side of the transparent display region, and configured to acquire light incident from a display side of the transparent display region and transmitted through the transparent display region,
    wherein the transparent display region is provided with pixel units, a light transmittance of the transparent display region is greater than a light transmittance of the main display region, the image acquisition component is configured to continuously acquire, at a predetermined time interval, light of a same moving object transmitting through the transparent display region, to obtain n images, diffraction spots of at least two of the n images are different, and the image acquisition component is further configured to merge the n images to obtain m synthetic image(s) to eliminate or weaken the diffraction spots in the n images, wherein n>=m, n is a natural number greater than or equal to 2, and m is a natural number greater than or equal to 1.

2. The display apparatus according to claim 1, wherein the image acquisition component is configured to superimpose the n images and retain only an overlapping part.

3. The display apparatus according to claim 1, wherein the transparent display region comprises a first transparent display region and a second transparent display region;
the first transparent display region comprises a first driving circuit arranged in an array and a first metal trace connected to the first driving circuit;
the second transparent display region comprises a second driving circuit arranged in an array and a second metal trace connected to the second driving circuit; and
an arrangement of the first driving circuit is different from that of the second driving circuit.

4. The display apparatus according to claim 3, wherein the second driving circuit is inclined relative to the first driving circuit.

5. The display apparatus according to claim 4, wherein an inclination angle of the second driving circuit relative to the first driving circuit is greater than 0 degrees and less than 45 degrees.

6. The display apparatus according to claim 3, wherein a metal layer is provided on the first metal trace to shield the first metal trace.

7. The display apparatus according to claim 3, wherein a metal layer is provided on the second metal trace to shield the second metal trace.

8. The display apparatus according to claim 3, wherein a shape of the first metal trace comprises a curve or a straight line.

9. The display apparatus according to claim 3, wherein a shape of the second metal trace comprises a curve or a straight line.

10. The display apparatus according to claim 3, wherein a line width of the first driving circuit is less than or equal to 2 microns and a line pitch of the first driving circuit is less than or equal to 1.8 microns.

11. The display apparatus according to claim 3, wherein a line width of the second driving circuit is less than or equal to 2 microns and a line pitch of the second driving circuit is less than or equal to 1.8 microns.

12. The display apparatus according to claim 3, wherein the first transparent display region and the second transparent display region are asymmetrical.

13. The display apparatus according to claim 3, wherein an area of the first transparent display region is different from that of the second transparent display region.

14. The display apparatus according to claim 3, wherein a light transmittance of the first transparent display region and a light transmittance of the second transparent display region are different.

15. The display apparatus according to claim 1, wherein the transparent display region comprises a first transparent display region and a second transparent display region;
the first transparent display region comprises a first driving circuit arranged in an array and a first metal trace connected to the first driving circuit;
the second transparent display region comprises a second driving circuit arranged in an array and a second metal trace connected to the second driving circuit; and
an extension direction of the first metal trace is different from that of the second metal trace.

16. The display apparatus according to claim 1, wherein the transparent display region comprises a first transparent display region and a second transparent display region;
the first transparent display region comprises a first driving circuit arranged in an array and a first metal trace connected to the first driving circuit;
the second transparent display region comprises a second driving circuit arranged in an array and a second metal trace connected to the second driving circuit; and
an arrangement of the first driving circuit is different from that of the second driving circuit, and, an extension direction of the first metal trace is different from that of the second metal trace.

17. The display apparatus according to claim 1, wherein the image acquisition component merges the n images to obtain the m synthetic image(s) by the following steps:
performing feature extraction on the n images to obtain P features of the n images, wherein P is an integer multiple of n;
identifying Q diffraction spot feature(s) corresponding to Q diffraction spot(s) of a current image in the n images and object feature(s) covered by the Q diffraction spot(s) in a non-current image, from the P features, wherein Q is a natural number less than n; and
performing feature fitting on the Q diffraction spot feature(s) and the object feature(s) covered by the Q diffraction spot(s) to obtain the m synthetic image(s).

18. A method for synthesizing images of a moving object, comprising:
obtaining n images of the moving object, wherein n is a natural number greater than or equal to 2, and the n images are captured continuously by a single image acquisition component at a predetermined time interval;
performing feature extraction on the n images to obtain P features of the n images, wherein P is an integer multiple of n;
identifying Q diffraction spot feature(s) corresponding to Q diffraction spot(s) of a current image in the n images and object feature(s) covered by the Q diffraction spot(s) in a non-current image, from the P features, wherein Q is a natural number less than n; and
performing feature fitting on the Q diffraction spot feature(s) and the object feature(s) covered by the Q diffraction spot(s) to obtain a synthetic image.

19. The method for synthesizing images of a moving object according to claim 18, further comprising:
identifying and comparing features of a non-diffraction spot in the P features to obtain S target category feature(s), wherein S is a natural number less than P/n; and
obtaining a target image of the moving object according to the S target category feature(s) and the synthetic image.

20. An electronic device, comprising:
a processor; and
a memory, wherein the memory comprises computer instructions stored thereon, and the computer instructions, when executed by the processor, cause the processor to execute the method for synthesizing images of the moving object according to claim 18.

* * * * *